United States Patent
Shin et al.

(10) Patent No.: US 9,232,494 B1
(45) Date of Patent: Jan. 5, 2016

(54) VIRTUAL RADIO MAP CONSTRUCTING METHOD AND DEVICE USING THE SAME

(71) Applicant: SOONGSIL UNIVERSITY RESEARCH CONSORTIUM TECHNO-PARK, Seoul (KR)

(72) Inventors: Yo An Shin, Seoul (KR); Kwang Yul Kim, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 0 days.

(21) Appl. No.: 14/749,658

(22) Filed: Jun. 25, 2015

(30) Foreign Application Priority Data

Jan. 20, 2015 (KR) ........................ 10-2015-0009195

(51) Int. Cl.
*H04W 24/00* (2009.01)
*H04W 64/00* (2009.01)

(52) U.S. Cl.
CPC .................................. *H04W 64/003* (2013.01)

(58) Field of Classification Search
CPC ....... H04W 4/025; H04W 4/02; H04W 24/00; H04W 16/18; H04W 48/00; H04W 76/02; H04W 88/08; H04W 8/00; G01S 5/14; H04L 67/34
See application file for complete search history.

(56) References Cited

U.S. PATENT DOCUMENTS

| 2013/0127613 A1* | 5/2013 | Zhang et al. | ......... A61B 6/4494 340/539.1 |
| 2014/0228048 A1* | 8/2014 | Saito et al. | .............. G01S 5/021 455/456.1 |

FOREIGN PATENT DOCUMENTS

KR 10-1390722 B1 4/2014

* cited by examiner

*Primary Examiner* — Quan M Hua
(74) *Attorney, Agent, or Firm* — Revolution IP, PLLC

(57) ABSTRACT

The present invention relates to a virtual radio map constructing method for Radio-positioning and a device using the same. An exemplary embodiment of the present invention provides a virtual radio map constructing method, including: converting first and second RSS values obtained from two access points adjacent to each of a plurality of access points into first and second RSS values of a linear unit; respectively dividing first and second distances between the access point and the two access points adjacent thereto in an exponential interval, and respectively dividing the first and second RSS values in the exponential interval; generating a plurality of virtual training points by using a plurality of points divided in the exponential interval, and respectively obtaining RSS values of the plurality of virtual training points; and respectively obtaining RSS values of reference points by using RSS values of at least one virtual training points.

12 Claims, 7 Drawing Sheets

■ Access point(AP)   ★ Terminal(mobile)

Target space 1   Target space 2   Target space 3

★ $(x, y)$

| $X_1$ | $Y_1$ | AP#1 (dB) | AP#2 (dB) | AP#3 (dB) | AP#4 (dB) |
|---|---|---|---|---|---|
| 1 | 1 | $RSS_{AP1(1,1)}$ | $RSS_{AP2(1,1)}$ | $RSS_{AP3(1,1)}$ | $RSS_{AP4(1,1)}$ |
| 1 | 2 | $RSS_{AP1(1,2)}$ | $RSS_{AP2(1,2)}$ | $RSS_{AP3(1,2)}$ | $RSS_{AP4(1,2)}$ |
| ? | ? | ? | ? | ? | ? |
| 5 | 15 | $RSS_{AP1(5,15)}$ | $RSS_{AP2(5,15)}$ | $RSS_{AP3(5,15)}$ | $RSS_{AP4(5,15)}$ |
| ? | ? | ? | ? | ? | ? |
| 20 | 20 | $RSS_{AP1(20,20)}$ | $RSS_{AP2(20,20)}$ | $RSS_{AP3(20,20)}$ | $RSS_{AP4(20,20)}$ |

Radio Map

● Access Point
● Virtual Training Point

VIRTUAL RADIO MAP CONSTRUCTING METHOD AND DEVICE USING THE SAME

CROSS-REFERENCE TO RELATED APPLICATION

This application claims priority to and the benefit of Korean Patent Application No. 10-2015-0009195 filed in the Korean Intellectual Property Office on Jan. 20, 2015, the entire contents of which are incorporated herein by reference.

BACKGROUND OF THE INVENTION (a) Field of the Invention

The present invention relates to a virtual radio map constructing method for Radio-positioning and a device using the same, and more particularly, to a virtual radio map constructing method and a device using the same that may simply construct a radio map.

(b) Description of the Related Art

Due to remarkable development of a mobile communication technology and spread of smartphones, a location based service (LBS) technology has been actively researched. Recently, since all smartphones includes a chip that can perform outdoor Radio-positioning by using a GPS and a mobile communication network, a LBS market has rapidly grown. However, the outdoor Radio-positioning technique using the GPS or the mobile communication network provides high precise location information outdoors, but since signal loss greatly occurs indoors or in shaded areas, precision of the Radio-positioning therein may rapidly decrease.

Accordingly, in order to improve precision of indoor Radio-positioning, techniques using received signal strength (RSS) of a WiFi access point (AP) that is widely installed indoors have been actively researched. The indoor Radio-positioning using the RSS includes a parameter method based on a radio model and a non-parametric method based on training data. The most popular method of the indoor Radio-positioning is the non-parametric method of a fingerprinting Radio-positioning method.

The indoor fingerprinting Radio-positioning method includes a radio map (RM) constructing step of collecting a RSS value at a reference point and a Radio-positioning step of estimating movement of a terminal by using the radio map.

As a typical a radio map constructing method through fingerprinting, a method of collecting a RSS value through training at each reference point is referred to as a static RM. The static RM continues to use the once measured value without updating it.

However, since an indoor wireless channel environment is changed depending on time, movement of an object, or the like, the RSS value changed according to an environment should be corrected in order to ensure precise positioning performance. However, whenever the environment is changed, it is not economical to construct the RM by obtaining a new RSS. Further, it is inefficient to obtain the RSS by measuring it several times at each reference position of a spacious indoor space, and the denser the reference positions are, the more the amount of labor and time is required to measure the RSS.

Background technology of the present invention is disclosed at Korean Patent No. 1390722 (Apr. 30, 2014).

The above information disclosed in this Background section is only to enhance the understanding of the background of the invention and therefore it may contain information that does not form the prior art that is already known in this country to a person of ordinary skill in the art.

SUMMARY OF THE INVENTION

The present invention has been made in an effort to provide a virtual radio map constructing method for Radio-positioning and a device using the same that may simply construct a radio map and may improve economical efficiency by easily updating RSS values regardless of change of an environment.

An exemplary embodiment of the present invention provides a virtual radio map constructing method, including: converting first and second received signal strengths (RSS values) obtained from two access points adjacent to each of a plurality of access points disposed in a target space into first and second RSS values of a linear unit; respectively dividing first and second distances between the access point and the two access points adjacent thereto in an exponential interval, and respectively dividing the converted first and second RSS values in the exponential interval; generating a plurality of virtual training points in the target space by using a plurality of points divided in the exponential interval between the access point and the two adjacent access points, and respectively obtaining RSS values of the plurality of virtual training points by using first and second RSS values corresponding to the virtual training point; and respectively obtaining RSS values of reference points by using RSS values of at least one virtual training points existing within a reference distance from each of the reference points arranged in an equal interval in the target space.

The virtual radio map constructing may further include constructing a radio map consisting of a plurality of RSS values per the reference point by separately obtaining the RSS values of the reference points based on each of the plurality of access points, wherein the radio map may be respectively constructed for each of a plurality of target spaces.

The virtual radio map constructing method may further include radio-positioning a location of the random node by comparing the plurality of RSS values obtained between a random node in the target space and the plurality of access points with RSS values stored in the radio map.

The dividing in the exponential interval may use the following equation:

$$D(t) = a\left(\frac{L}{a}\right)^{t/T}$$

wherein $D(t)$ denotes a t-th divided distance or a RSS value, a denotes an initial starting value used for the dividing, L denotes a final target value used for the dividing, and T denotes a total divided number, $t = \{1, \ldots, T\}$.

The obtaining of each of the RSS values of the virtual training points may use the following equation:

$$VTP(x_i, y_j) = \frac{\alpha_{x_i} \beta_{y_j} \max(\alpha_{x_i}, \beta_{y_j})}{2(\alpha_{x_i}^2 + \beta_{y_j}^2)}$$

wherein $VTP(x_i, y_j)$ denotes a RSS value of a virtual training point (VTP) generated at point $(x_i, y_j)$ in the target space, and $\alpha_{x_i}$ and $\beta_{y_j}$ denote a first RSS value and a second RSS value corresponding to point $(x_i, y_j)$.

The obtaining of each of the RSS values of the reference points may obtain an average of the RSS values of the at least one virtual training points existing within the reference distance from the reference point as a RSS value of the reference point.

Another embodiment of the present invention provides a virtual radio map construction device, including: a linear unit converter configured to convert first and second received signal strengths (RSS values) obtained from two access points adjacent to each of a plurality of access points disposed in a target space into first and second RSS values of a linear unit; an exponential interval divider configured to respectively divide first and second distances between the access point and the two access points adjacent thereto in an exponential interval, and respectively dividing the converted first and second RSS values in the exponential interval; a virtual point generator configured to generate a plurality of virtual training points in the target space by using a plurality of points divided in the exponential interval between the access point and the two adjacent access points; a virtual point calculator configured to respectively obtain RSS values of the plurality of virtual training points by using first and second RSS values corresponding to the virtual training point; and a reference point calculator configured to respectively obtain RSS values of reference points by using RSS values of at least one virtual training points existing within a reference distance from each of the reference points arranged in an equal interval in the target space.

The virtual radio map construction device may further include a radio map constructor configured to construct a radio map consisting of a plurality of RSS values per the reference point by separately obtaining the RSS values of the reference points based on each of the plurality of access points.

The virtual radio map construction device may further include a Radio-positioning portion configured to perform radio-positioning of a location of the random node by comparing the plurality of RSS values obtained between a random node in the target space and the plurality of access points with RSS values stored in the radio map.

According to a virtual radio map constructing method for Radio-positioning and a device using the same according to an exemplary embodiment of the present invention, it is possible to simply construct a radio map for Radio-positioning because of generating a plurality of virtual training points based on a few RSS values and autonomously generating a RSS value of each position of the reference points by using the virtual training points.

Further, according to the exemplary embodiment of the present invention, since RSS values changed according to time and space may be easily updated, it is possible to improve economical efficiency and reduce complexity than conventional methods, and thus an overall system therefor may be efficiently constructed and operated.

DETAILED DESCRIPTION OF THE EMBODIMENTS

The present invention will be described more fully hereinafter with reference to the accompanying drawings, in which exemplary embodiments of the invention are shown.

An exemplary embodiment of the present disclosure provides a virtual radio map constructing method for Radio-positioning and a device using the same, and more specifically, provides a method and a device that can simply construct a radio map by generating a plurality of virtual training points based on a few received signal strengths (RSSs) that are previously known and by autonomously generating a RSS of each position of the reference points by using the virtual training points.

The method of constructing the virtual radio map according to the exemplary embodiment of the present invention includes the basic concept of the fingerprinting Radio-positioning method. First, before describing the exemplary embodiment of the present invention in detail, a typical fingerprinting Radio-positioning method will be described more fully.

Figure 1:
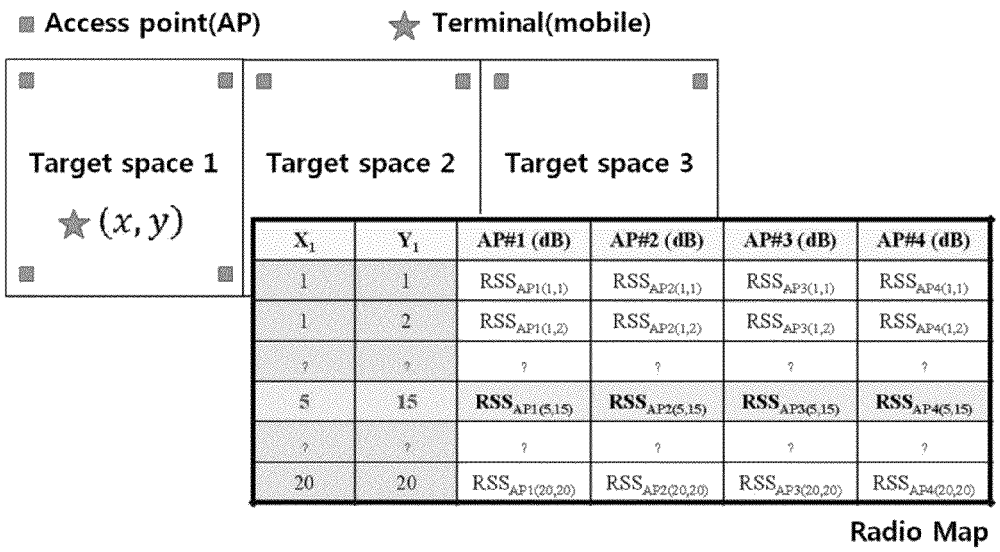
FIG. 1 is a drawing illustrating a fingerprinting Radio-positioning method used in an exemplary embodiment of the present invention.

FIG. 1 is a drawing illustrating a typical fingerprinting Radio-positioning method. The fingerprinting method consists of an offline step and an online step. The offline step is a process that measures RSS value at each reference point through a local search to construct a radio map, and the online step is a process that estimates a position of a random terminal in a target space by using data of the constructed radio map.

Referring to FIG. 1, four access points (APs) are disposed in the target space. A plurality of reference points with a uniform interval will be assumed to be in a matrix format in the target space. In order to construct the radio map, after disposing a terminal at the reference point, a method in which the terminal obtains a RSS value of a signal received from each access point (AP) is used. The RSS values obtained at point (5, 15) of the target space may be referred to as $RSS_{AP1(5,15)}$, $RSS_{AP2(5,15)}$, $RSS_{AP3(5,15)}$, and $RSS_{AP4(5,15)}$. When the method is sequentially preformed at the total training points (TPs), a radio map with respect to the target space is constructed. Further, when the aforementioned method is performed in each of the target spaces, radio maps with respect to the target spaces 1, 2, 3 may be separately constructed.

Radio-positioning of a random terminal present in the corresponding target space may be performed by using the constructed radio map. In this case, a location of the random terminal is estimated thereof by comparing the RSS values that the random terminal receives from each of the access points with a pre-stored RSS values in the radio map. A K-NN algorithm that is represented by Equation 1 is mainly used for the location estimate.

$$\hat{P}_{k-NN} = \sum_{i=1}^{k} P(i), i = 1, \ldots, k \quad \text{(Equation 1)}$$

Here, P(i) means that reference points are arranged from 1 to k based on likelihood density between a measured RSS and a pre-stored RSS in a radio map. The K-NN algorithm is a method that estimates an average point of k reference points with priorities as a location of a terminal. Since the K-NN algorithm is well known to those skilled in the art, a detailed description will be omitted.

However, according to the the radio map constructing method described above, since all RSS values of reference points in a wide range of space are collected, the above described method is inefficient and a system of the method is complicated. Further, whenever the temporal or spatial environment is changed, since RSS values of reference points are newly measured, such that the above described method results in discomfort and is not economical.

Exemplary embodiments of the present invention, which solve the above mentioned problems, provide a radio map constructing method that can autonomously form an efficient and economical radio map by automatically generating a plurality of virtual training points based on only a few RSS values.

Figure 2:
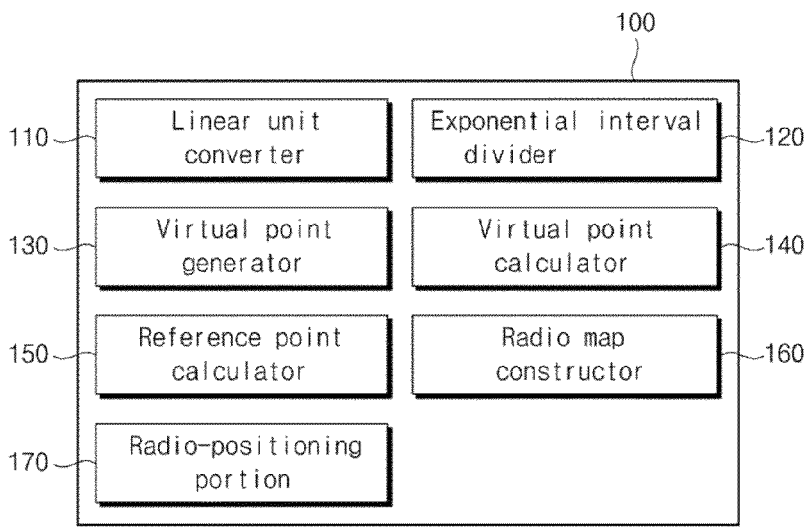
FIG. 2 is a block diagram of a virtual radio map constructing device according to an exemplary embodiment of the present invention.

A radio map constructing method according to an exemplary embodiment of the present invention will now be described in detail. FIG. 2 is a block diagram of a virtual radio map constructing device according to an exemplary embodiment of the present invention, and FIG. 3 is a flowchart of a radio map constructing method using the virtual radio map constructing device of FIG. 2.

Figure 3:
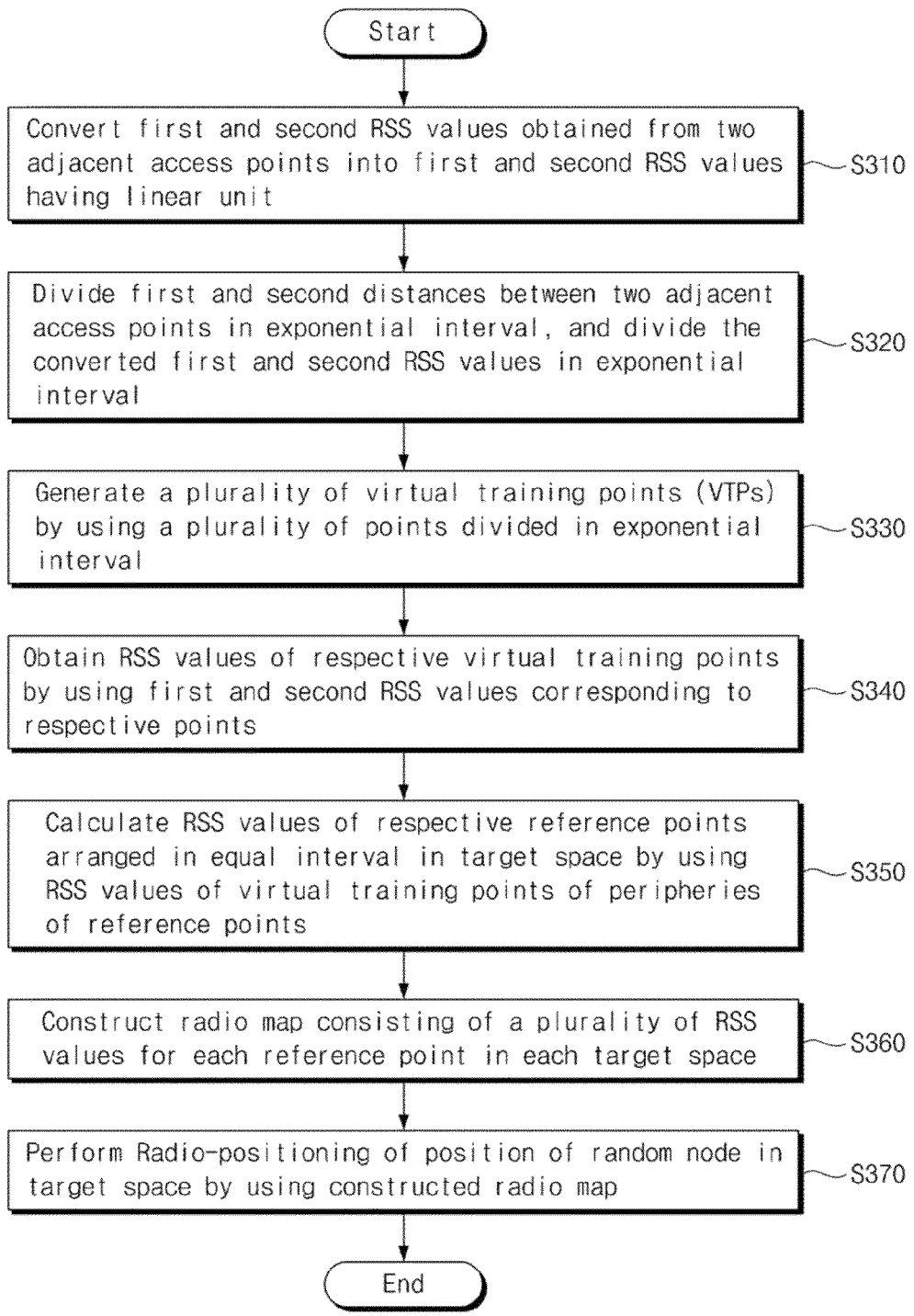
FIG. 3 is a flowchart of a radio map constructing method using the virtual radio map constructing device of FIG. 2.

Referring to FIGS. 2 and 3, a virtual radio map construction device 100 according to an exemplary embodiment of the present invention includes a linear unit converter 110, an exponential interval divider 120, a virtual point generator 130, a virtual point calculator 140, a reference point calculator 150, a radio map constructor 160, an a Radio-positioning portion 170.

First, the linear unit converter 110 converts first and second received signal strengths (RSSs or RSS values) obtained from two access points adjacent to each of a plurality of access points disposed in a target space into first and second RSS values of a linear unit (S310).

Such step S310 is a process in which the RSS values of signals received from two access points adjacent to one access point based on the one access point (two access points adjacent thereto in horizontal and vertical directions) are converted into the linear unit values, respectively. Of course, the process of step 310 is separately performed with respect to all the access points.

Figure 4:
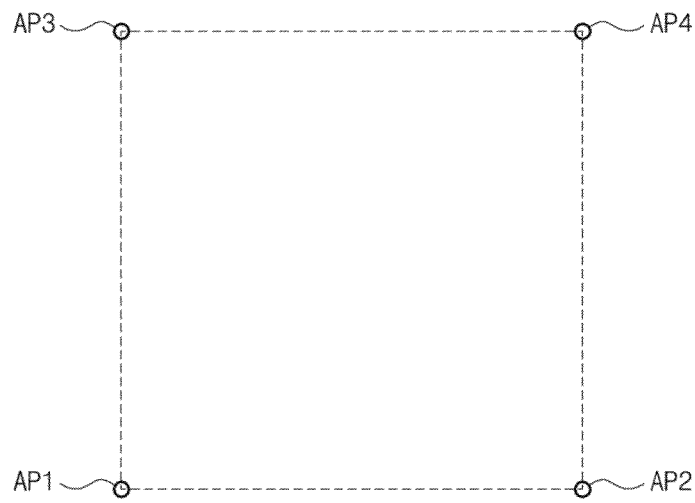
FIG. 4 is an exemplary diagram of access points that is disposed in a target space according to an exemplary embodiment of the present invention.

FIG. 4 is an exemplary diagram of access points that is disposed in a target space according to an exemplary embodiment of the present invention. In FIG. 4, four access points (AP1, AP2, AP3, and AP4) of the target space are disposed in a square form and in the same interval from each other. However, the present invention is not limited to the disposed example of the access points of FIG. 4. Further, the access point may be a WiFi access point, but the type of the access point also is not limited thereto.

Step S310 will now be described based on the first access point AP1 shown in FIG. 4.

For better comprehension and ease of description, the first access point will be described as a representative example. Of course, step S310 may be performed for second to fourth access points in the same way as the first access point.

The two access points adjacent to the first access point AP1 are second and third access points AP2 and AP3. Herein, before step S310 is performed, the first access point AP1 previously obtains and stores a first RSS value and a second RSS value corresponding to RSS values of signals respectively received from the second access point AP2 and the third access point AP3. Further, distances between the access points is previously obtained and stored. In the case of the present exemplary embodiment, all of the distances between access points are equal.

Since a unit of the obtained first and second RSS values is a dB unit, a process of converting the dB unit into a linear unit is required. Accordingly, the linear unit converter 110 converts the first and second RSS values into the linear unit values. The linear unit conversion uses the following Equation 2.

$$\text{Linear}_{RSS} = 10^{(dB_{RSS}/10)} \quad \text{(Equation 2)}$$

Here, $dB_{RSS}$ is a RSS value of the dB unit obtained by measuring, and $\text{Linear}_{RSS}$ is a RSS value of the linear unit converted by Equation 2. When the first and second RSS values of the dB unit are substituted into Equation 2, the first and second RSS values of the linear unit may be easily obtained.

However, according to the radio model, as a distance increases, the RSS value may decrease in an exponential form. In order to consider this, the exemplary embodiment of the present invention includes a process of dividing the first and second RSS values converted to the linear unit in an exponential interval, and a process of dividing the distances between the access points in an exponential interval.

That is, after step S310, the exponential interval divider 120 divides the first and second distances known in advance between the access point AP1 and the two adjacent access points AP2 and AP3 in the exponential interval, respectively, and it divides the converted first and second RSS values in the exponential interval, respectively (S320).

First, the distance between the AP1 and the AP2 is divided in the exponential interval, and the distance between the AP1 and the AP3 is divided in the exponential interval. The process of being divided in the exponential interval may be performed through Equation 3. Herein, all of the distances between the access points other than distances of a diagonal direction are assumed to be the same distance, 'd'.

$$D(t) = a\left(\frac{L}{a}\right)^{t/T} \quad \text{(Equation 3)}$$

Here, D(t) denotes a t-th divided distance, a ($ab^0=a$) denotes an initial starting value used for dividing, L ($ab^T=L$) denotes a final target value used for dividing, and T denotes a total divided number, t={1, ..., T}.

Figure 5:
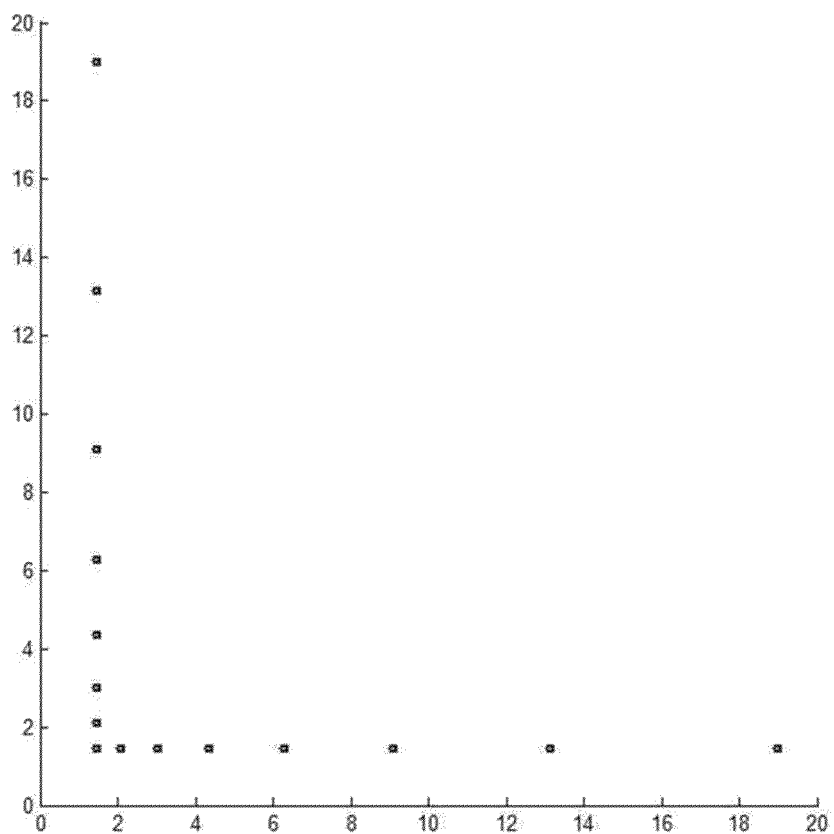
FIG. 5 is a drawing illustrating an example in which a distance between access points is divided in an exponential interval according to an exemplary embodiment of the present invention.

FIG. 5 is a drawing illustrating an example in which a distance between access points is divided in an exponential interval according to an exemplary embodiment of the present invention. FIG. 5 illustrates that the distance between the AP1 and AP2 and the distance between the AP1 and the AP3 are divided in an exponential interval.

FIG. 5 illustrates results divided in a total of 8 exponential intervals between 1 m and 19 m when the distance (d) between APs is 20 m, the initial starting value (a) is 1, the final target value (L) is 19, and the total divided number (T) is 8. In the case of FIG. 5, the initial starting value is used as a value greater than 0, and the final target value is used as a value lesser than the distance (d) between the access points. That is, the initial starting value and the final target value are set between 0 and d.

When such a method is applied to the first and second RSS values converted to the linear unit in the same way, the first RSS value and the second RSS value may also be divided into 8 exponential intervals. In this case, D(t) of Equation 3 become the t-th converted RSS value between the initial starting value (a) and the final target value (L). In this case, the initial starting value and the final target value may be set between 0 and the linear RSS value, respectively.

However, the initial starting value, the final target value, and the divided number may be preferably set so that the corresponding RSS values may be divided in the same ratio and number as a previous distance division.

The exemplary embodiment of the present invention may include a storage unit that maps and stores each of the divided points and the divided RSS values corresponding to the divided points each other. That is, with respect to all of the points shown in FIG. 5, the first RSS value and the second RSS value of the corresponding points are mapped each other and then the mapped values may be stored in the storage.

Next, the virtual point generator 130 generates a plurality of virtual training points (VTPs) in the target space by using a plurality of points divided in the exponential interval between the access point AP1 and the two adjacent access points AP2 and AP3 (S330).

Figure 6:
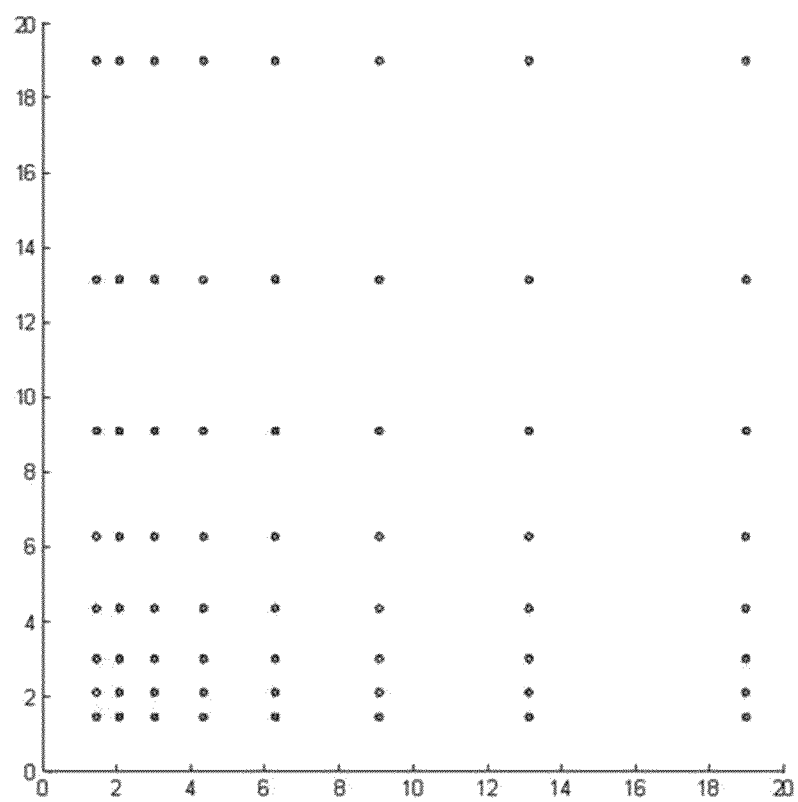
FIG. 6 is a drawing illustrating an example of generating a plurality of virtual training points in a target space by using the results of FIG. 5.

FIG. 6 is a drawing illustrating an example of generating a plurality of virtual training points in a target space by using the results of FIG. 5. That is, if a plurality of first points divided in an exponential interval between the AP1 the AP2 and a plurality of second points divided in an exponential interval between the AP1 and the AP3 correspond to virtual lines crossing each other, a plurality of crossing points are generated, such that the crossing points may be obtained as virtual training points (VTPs). Of course, the virtual training points include the plurality of first points, the plurality of second points, and crossing points.

The exemplary embodiment of the present invention may generate the plurality of virtual training points (VTPs) in an entire area through the above described method. Further, the exemplary embodiment of the present invention may map and store each of the virtual training points to the RSS value corresponding to the virtual training point.

Figure 7:
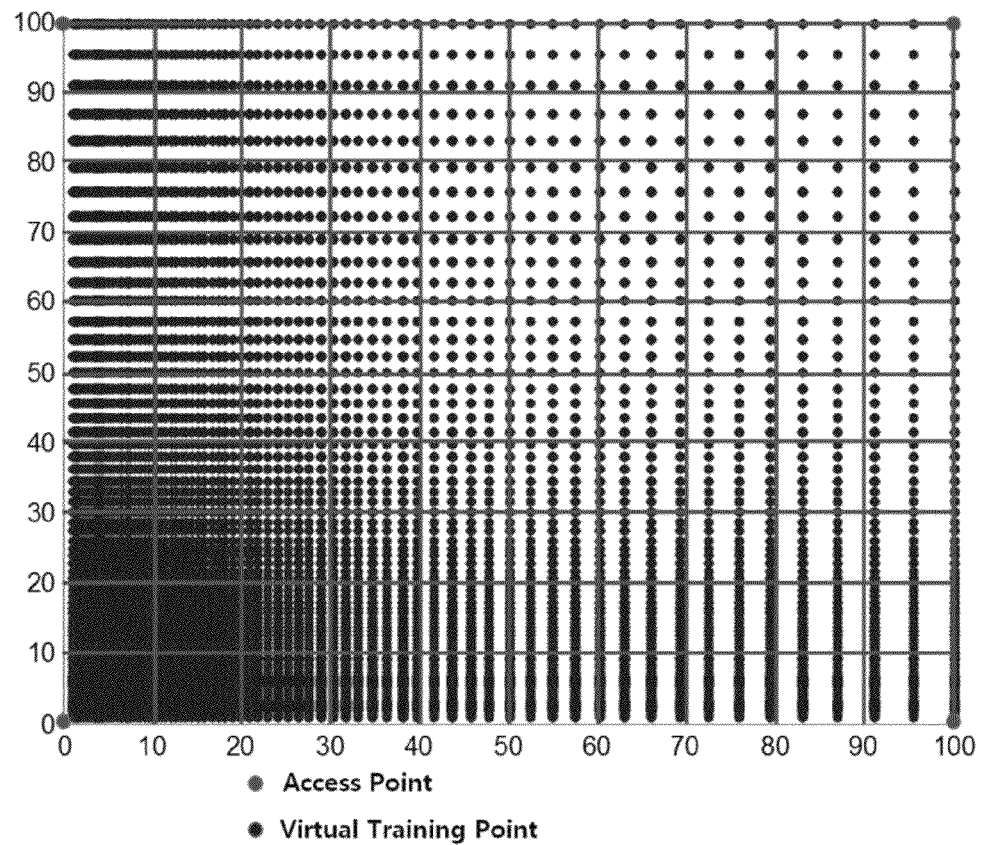
FIG. 7 is a drawing illustrating an example of generating a plurality of virtual training points in a target space according to another exemplary embodiment of the present invention.

FIG. 7 is a drawing illustrating an example of generating a plurality of virtual training points in a target space according to another exemplary embodiment of the present invention. Referring to FIG. 7, virtual points are densely generated in a spacious target space. That is, FIG. 7 illustrates a plurality of virtual training points (VTPs) generated by using a second access point AP2 positioned at point (100, 0) and a third access point AP3 positioned at point (0, 100) based on a first access point AP1 positioned at point (0, 0).

FIG. 7 illustrates results divided in a total of 100 exponential intervals between 1 m and 100 m when a distance (d) between APs is 100 m, the initial starting value (a) is 1, the final target value (L) is 100, and the total divided number (T) is 100. As a radius based on point (0, 0) of the first access point AP1 increases, intervals between the virtual training points (VTPs) exponentially increase. That is, in FIG. 7, it can be seen that the intervals between the virtual training points gradually increase toward the upper right from the lower left.

After the virtual training points (VTPs) are generated by the method described above, a RSS value corresponding to each of the virtual training points (VTPs) is calculated.

That is, the virtual point calculator 140 obtains RSS values of respective the virtual training points (VTPs) by using the first and second RSS values corresponding to respective virtual training points (VTPs) (S340).

Herein, a RSS value of a virtual training point (VTP), VTP $(x_i, y_i)$ generated at point $(x_i, y_i)$ in the target space may be calculated through the following Equation 4.

$$VTP(x_i, y_j) = \frac{\alpha_{x_i} \beta_{y_j} \max(\alpha_{x_i}, \beta_{y_j})}{2(\alpha_{x_i}^2 + \beta_{y_j}^2)} \quad \text{(Equation 4)}$$

Here, $\alpha_{x_i}$ and $\beta_{y_j}$ denote the first RSS value and the second RSS value corresponding to point $(x_i, y_i)$. Here, max(•) is a function of selecting the maximum value from the values in brackets.

Figure 8:
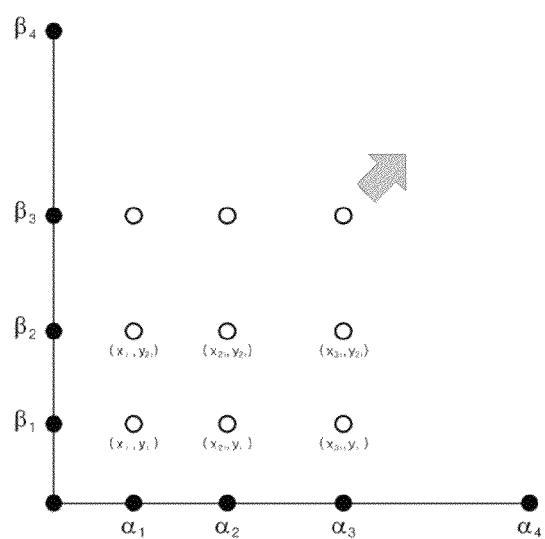
FIG. 8 is a drawing illustrating a method of obtaining RSS values of virtual training points according to an exemplary embodiment of the present invention.

FIG. 8 is a drawing illustrating a method of obtaining RSS values of virtual training points according to an exemplary embodiment of the present invention. A reference point of a lower left end in FIG. 8 means a position of the first access point AP1. Further, α and β denoted in FIG. 8 represent the first RSS value and the second RSS value of the corresponding points.

When a RSS value, VTP $(x_{2i}, y_i)$ of a virtual training point corresponding to point $(x_{2i}, y_i)$ is required to be obtained, it may be obtained by substituting $\alpha_2$ value, $\beta_1$ value into $\alpha_{x_i}, \beta_{y_j}$ in Equation 4, and max$(\alpha_2, \beta_1)=\beta_1$ is satisfied. Herein, since the RSS value exponentially decreases depending a distance based on the same access point, the larger value among $\alpha_2$ and $\beta_1$ becomes $\beta_1$. By using a method such as Equation 4, all of the RSS values of a plurality of virtual training points (VTPs) may be obtained.

However, referring to FIG. 8, since respective virtual training points (VTPs) are disposed in the exponential interval based on the first access point AP1, a radio map formed in the same interval based on the first access point AP1 is not able to be constructed.

According to the exemplary embodiment of the present invention, RSS values of respective reference points disposed in the same interval based on the first access point AP1 are calculated by using a RSS value of at least one virtual training point adjacent to peripheries of the reference point. Accordingly, a radio map constructed by the RSS values of the reference points formed in the same interval may be generated.

Figure 9:
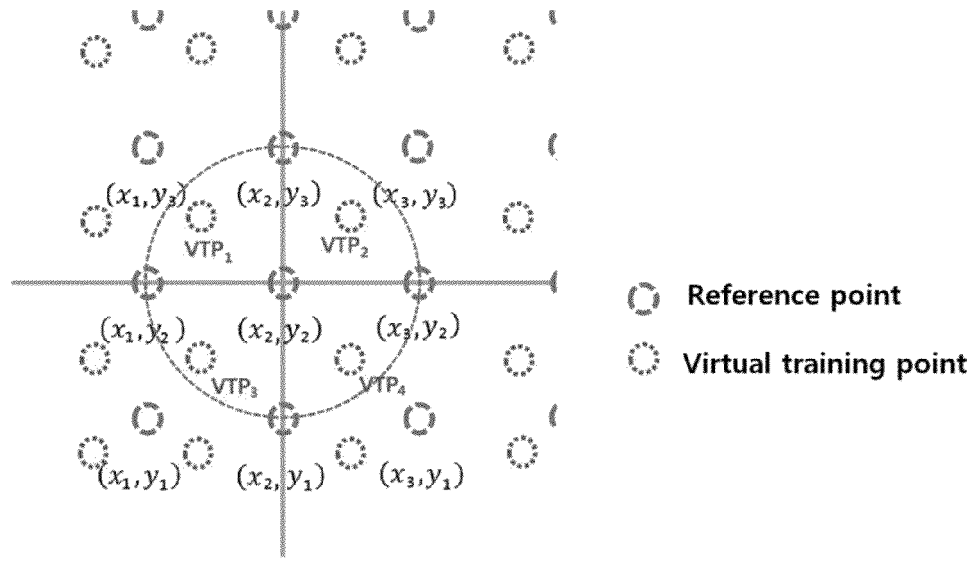
FIG. 9 is a drawing illustrating a method of calculating RSS values of reference points arranged in an equal interval in a target space by using RSS values of virtual training points according to an exemplary embodiment of the present invention.

The process of obtaining the RSS value of the reference point will now be described more fully. FIG. 9 is a drawing illustrating a method of calculating RSS values of reference points arranged in an equal interval in a target space by using RSS values of virtual training points according to an exemplary embodiment of the present invention.

In the exemplary embodiment of the present invention, the reference point calculator 150 respectively obtains RSS values of reference points by averaging RSS values of at least one virtual training points (VTPs) existing within a reference distance from each of reference points arranged in an equal interval in a target space (S350).

FIG. 9 illustrates a process of obtaining a RSS value of a reference point ($x_2$, $y_2$) among a plurality of reference points displayed on a screen. In FIG. 9, a circle drawn based on point ($x_2$, $y_2$) represents a radius corresponding to a reference distance from point ($x_2$, $y_2$). In FIG. 9, the reference distance is set to be equal to a distance between the reference points. Of course, the reference distance may be greater or lesser than the distance between the reference points.

Since the virtual training points inside the circle from point ($x_2$, $y_2$) are a total of four virtual training points ($VTP_1$, $VTP_2$, $VTP_3$, and $VTP_4$), when the average of the RSS values of the four points is obtained, the RSS value of the reference point of point ($x_2$, $y_2$) may be calculated.

It should be understand that the virtual training points (VTPs) in FIG. 9 are illustrated in a wider interval for better comprehension and ease of description. Herein, when the obtained RSS values of respective reference points are stored in the radio map later, they may be again converted in the dB unit.

Steps S310 to S350 are applied to each of the second access point, the third access point, and the fourth access point in the same way as described above. That is, the RSS values of the plurality of reference points are separately obtained based on each of the first to fourth access points.

In this way, the radio map constructor 160 constructs a radio map that consists of a plurality of RSS values for each reference point by separately obtaining the RSS values of the reference points based on each of the plurality of access points (S360).

Figure 10:
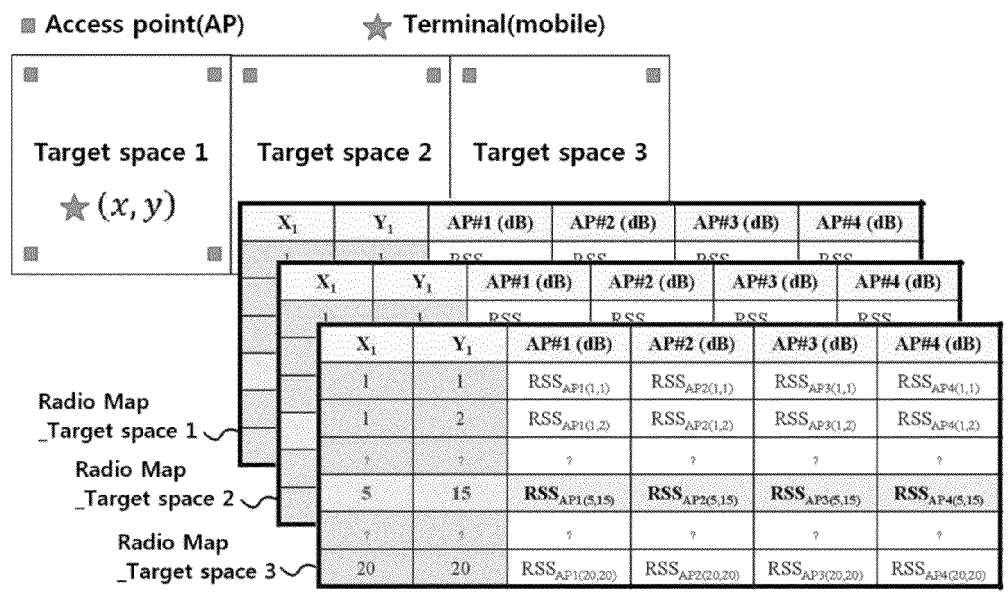
FIG. 10 is an exemplary diagram of a radio map that is constructed according to an exemplary embodiment of the present invention.

The process of constructing the radio map is separately performed in each of a plurality of target spaces. FIG. 10 is an exemplary diagram of a radio map that is constructed according to an exemplary embodiment of the present invention.

Referring to FIG. 10, it can be seen that a radio map for a target space 1, a radio map for a target space 2, and a radio map for a target space 3 are separately constructed. Further, it can be seen that the RSS values corresponding to the number of the access points are stored per the reference point of each radio map.

As such, when the radio maps are constructed, positioning for a random node in the target space can be performed. That is, the Radio-positioning portion 170 performs radio-positioning of a location of the random node by comparing the plurality of RSS values obtained between the random node in the target space and the plurality of access points with the RSS values pre-stored in the radio map (S370). A method used in the Radio-positioning may include the above-described k-NN algorithm and the like.

The exemplary embodiment of the present invention may generate the plurality of virtual training points based on a few of information known in advance, that is, the RSS values between the access points and the distances between the access points, and the RSS values of all of the reference points may be autonomously generated by using the RSS values of the virtual training points.

Accordingly, according to the exemplary embodiment of the present invention, the process of constructing the radio map may be greatly simplified, and even when time or space is changed, since only the RSS values and distances between the access points are required to be newly measured, the process of updating the radio map may be simplified, and it is economical in terms of time and cost.

Simulation results obtained by using a MATLAB as a method for verifying performance of the radio map constructing method according to the exemplary embodiment of the present invention will now be described. A simulation space is provided in a square of $20 \times 20$ m$^2$, and the distance between the reference points used for constructing the radio map (RM) is changed in an interval of 1 m in a range of 1 to 5 m to be measured. The conventional static RM (SRM) method constructs a radio map by using a radio propagation model of Equation 5 according to change of a distance.

$$P_{rx}[\text{dBm}] = P_{tx}[\text{dBm}] + K[\text{dB}] - 10\eta \log_{10}\left(\frac{d}{d_0}\right) + \psi \quad \text{(Equation 5)}$$

Here, $P_{rx}$ denotes transmission signal strength, K denotes an environment constant, $d_0$ denotes a reference distance, $\eta$ denotes a path loss coefficient (it is set to 4 indoors), and $\psi$ denotes a fading effect parameter. Further, in the indoor wireless channel environment, a large scale fading environment and a small scale fading environment including shadowing that is instantaneously changed are considered. Terminals are randomly disposed, and performance of the system is evaluated by using an mean distance error (MDE) of an actual position and an estimated position. Equation 6 represents a calculation equation of a radio-positioning performance index, MDE.

$$\frac{1}{M}\sum_{i=1}^{M}\sqrt{(\hat{x}_i - x_i)^2 + (\hat{y}_i - y_i)^2} \quad \text{(Equation 6)}$$

Here, M denotes the number of Radio-positioning, ($x_i$, $y_i$) denotes an actual position of a terminal, ($\hat{x}_i$, $\hat{y}_i$) denotes an position estimated by Radio-position ing.

Figure 11:
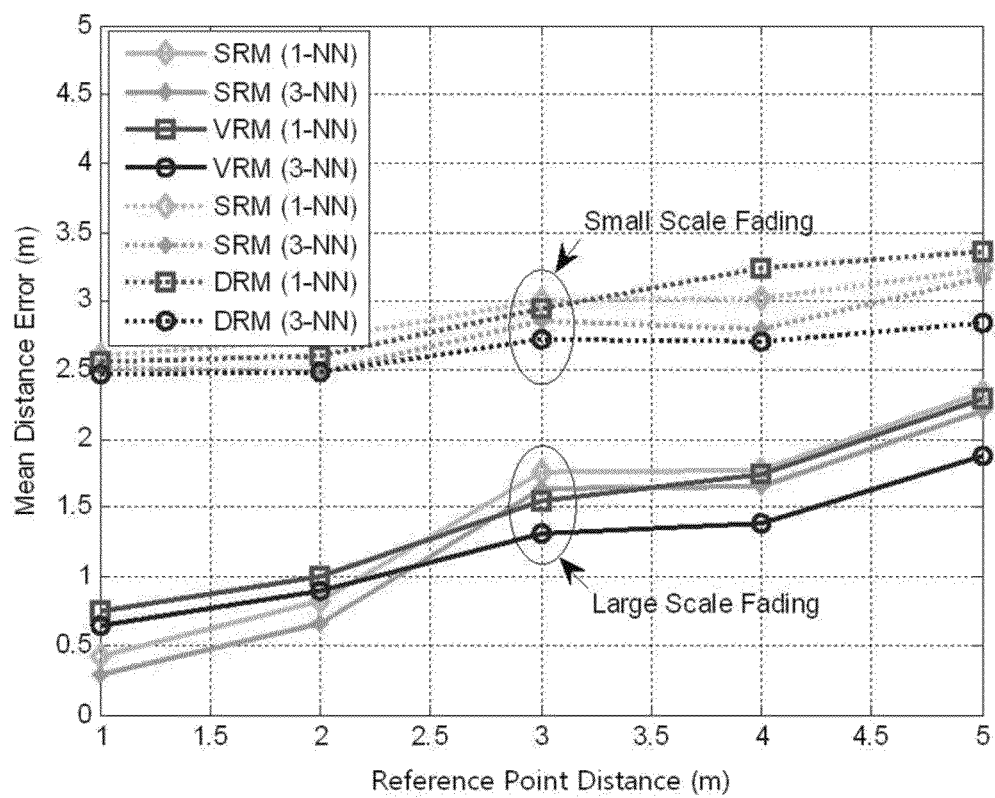
FIG. 11 is a graph illustrating performance of a mean distance error (MDE) of a radio map depending on a reference distance according to an exemplary embodiment of the present invention.

FIG. 11 is a graph illustrating performance of a mean distance error (MDE) of a radio map depending on a reference distance according to an exemplary embodiment of the present invention. In FIG. 11, the horizontal axis represents a distance between the reference points, and the vertical axis represents a mean distance error (MDE; average distance error). The virtual radio map (VRM) represents a technique according to the present exemplary embodiment, and the static radio map (SRM) represents a technique of the related art.

When an interval is about 1 m in a large scale fading environment according to a distance, the VRM technique results in an error of about 0.6 m, and the SRM technique results in an error of about 0.3 m. Since this is a distance corresponding to a step length of a person, the difference substantially small. In addition, when an interval between the reference points is increased, it can be seen that performance of the proposed VRM technique is improved over performance of a general technique.

In a small scale fading environment according to instantaneous change, when an interval between the reference points is about 1 m, even though the SRM technique and the proposed VRM technique result in an error of about 2.5 m as a relatively large error, as the interval increases, it can be seen that performance of the proposed VRM technique is improved over performance of the general SRM technique.

Accordingly, although the proposed VRM technique autonomously forms the radio map by using the VTP, it can be seen that its performance is equal to or better than that of the SRM technique. Particularly, when the proposed VRM technique uses a wide interval, since the construction and update time of the overall system may be shortened and the calculation amount may be reduced, the indoor fingerprinting Radio-positioning system may be more efficiently and economically constructed and operated.

As described above, according to the exemplary embodiments of the present invention, it is possible to simply construct a radio map for Radio-positioning because of generating a plurality of virtual training points based on a few RSS values and autonomously generating a RSS value of a position of each reference point by using the virtual training points. Further, according to the exemplary embodiments of the present invention, since RSS values changed according to time and space may be easily updated, it is possible to improve economical efficiency and reduce complexity than conventional methods, and thus an entire system therefor may be efficiently built and operated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A virtual radio map constructing method, comprising:
   converting first and second received signal strengths (RSS values) obtained from two access points adjacent to each of a plurality of access points disposed in a target space into first and second RSS values of a linear unit;
   respectively dividing first and second distances between an access point of the plurality of access points and the two access points adjacent thereto in an exponential interval, and respectively dividing the converted first and second RSS values in the exponential interval;
   generating a plurality of virtual training points in the target space by using a plurality of points divided in the exponential interval between the access point and the two adjacent access points, and respectively obtaining RSS values of the plurality of virtual training points by using first and second RSS values corresponding to the virtual training point; and
   respectively obtaining RSS values of reference points by using RSS values of at least one virtual training points existing within a reference distance from each of the reference points arranged in an equal interval in the target space.

2. The virtual radio map constructing method of claim 1, further comprising:
   constructing a radio map consisting of a plurality of RSS values per the reference point by separately obtaining the RSS values of the reference points based on each of the plurality of access points,
   wherein the radio map is respectively constructed for each of a plurality of target spaces.

3. The virtual radio map constructing method of claim 2, further comprising:
   radio-positioning a location of a random node by comparing the plurality of RSS values obtained between a random node in the target space and the plurality of access points with RSS values stored in the radio map.

4. The virtual radio map constructing method of claim 1, wherein
   the dividing in the exponential interval uses the following equation:

$$D(t) = a\left(\frac{L}{a}\right)^{t/T}$$

wherein D(t) denotes a t-th divided distance or a RSS value, a denotes an initial starting value used for the dividing, L denotes a final target value used for the dividing, and T denotes a total divided number, t={1, ..., T}.

5. The virtual radio map constructing method of claim 1, wherein
   the obtaining of each of the RSS values of the virtual training points uses the following equation:

$$VTP(x_i, y_j) = \frac{\alpha_{x_i} \beta_{y_j} \max(\alpha_{x_i}, \beta_{y_j})}{2(\alpha_{x_i}^2 + \beta_{y_j}^2)}$$

wherein VTP ($x_i$, $y_j$) denotes a RSS value of a virtual training point (VTP) generated at point ($x_i$, $y_j$) in the target space, and $\alpha_{x_i}$ and $\beta_{y_j}$ denote a first RSS value and a second RSS value corresponding to point ($x_i$, $y_j$).

6. The virtual radio map constructing method of claim 1, wherein
   the obtaining of each of the RSS values of the reference points obtains an average of the RSS values of the at least one virtual training points existing within the reference distance from the reference point as a RSS value of the reference point.

7. A virtual radio map construction device, comprising:
   a storage;
   a linear unit converter configured to convert first and second received signal strengths (RSS values) obtained from two access points adjacent to each of a plurality of access points disposed in a target space into first and second RSS values of a linear unit;
   an exponential interval divider configured to respectively divide first and second distances between an access point of the plurality of access points and the two access points adjacent thereto in an exponential interval, and respectively dividing the converted first and second RSS values in the exponential interval;
   a virtual point generator configured to generate a plurality of virtual training points in the target space by using a plurality of points divided in the exponential interval between the access point and the two adjacent access points;
   a virtual point calculator configured to respectively obtain RSS values of the plurality of virtual training points by using first and second RSS values corresponding to the virtual training point; and
   a reference point calculator configured to respectively obtain RSS values of reference points by using RSS values of at least one virtual training points existing within a reference distance from each of the reference points arranged in an equal interval in the target space.

8. The virtual radio map construction device of claim 7, further comprising:
   a radio map constructor configured to construct a radio map consisting of a plurality of RSS values per the reference point by separately obtaining the RSS values of the reference points based on each of the plurality of access points,
wherein the radio map is respectively constructed for each of a plurality of target spaces.

9. The virtual radio map construction device of claim 8, further comprising:
a Radio-positioning portion configured to perform radio-positioning of a location of the random node by comparing the plurality of RSS values obtained between a random node in the target space and the plurality of access points with RSS values stored in the radio map.

10. The virtual radio map construction device of claim 7, wherein
the exponential interval divider uses the following equation when it performs the dividing in the exponential interval:

$$D(t) = a\left(\frac{L}{a}\right)^{t/T}$$

wherein D(t) denotes a t-th divided distance or a RSS value, a denotes an initial starting value used for the dividing, L denotes a final target value used for the dividing, and T denotes a total divided number, $t=\{1, \ldots, T\}$.

11. The virtual radio map construction device of claim 7, wherein
the virtual point calculator obtains each of the RSS values of the virtual training points through the following equation:

$$VTP(x_i, y_j) = \frac{\alpha_{x_i} \beta_{y_j} \max(\alpha_{x_i}, \beta_{y_j})}{2(\alpha_{x_i}^2 + \beta_{y_j}^2)}$$

wherein VTP $(x_i, y_j)$ denotes a RSS value of a virtual training point (VTP) generated at point $(x_i, y_j)$ in the target space, and $\alpha_{x_i}$ and $\beta_{y_j}$ denote a first RSS value and a second RSS value corresponding to point $(x_i, y_j)$.

12. The virtual radio map construction device of claim 7, wherein
the reference point calculator obtains an average of the RSS values of the at least one virtual training points existing within the reference distance from the reference point as a RSS value of the reference point.

* * * * *